US012749806B2

(12) United States Patent
Li et al.

(10) Patent No.: US 12,749,806 B2
(45) Date of Patent: Sep. 29, 2026

(54) MILLIMETER-WAVE ANTENNA STRUCTURE AND MILLIMETER-WAVE ANTENNA MODULE

(71) Applicant: UNIVERSAL SCIENTIFIC INDUSTRIAL ( SHANGHAI ) CO., LTD., Shanghai (CN)

(72) Inventors: Kuan-Hsing Li, Shanghai (CN); Kuang-Ting Chi, Shanghai (CN)

(73) Assignee: UNIVERSAL SCIENTIFIC INDUSTRIAL ( SHANGHAI ) CO., LTD., Shanghai (CN)

( * ) Notice: Subject to any disclaimer, the term of this patent is extended or adjusted under 35 U.S.C. 154(b) by 44 days.

(21) Appl. No.: 19/005,078

(22) Filed: Dec. 30, 2024

(65) Prior Publication Data

US 2025/0309532 A1 Oct. 2, 2025

(30) Foreign Application Priority Data

Mar. 29, 2024 (CN) ........................ 202410383293.X

(51) Int. Cl.

| | |
|---|---|
| ***H01Q 1/52*** | (2006.01) |
| ***H01Q 1/22*** | (2006.01) |
| ***H01Q 1/50*** | (2006.01) |
| ***H01Q 21/00*** | (2006.01) |
| *H01Q 13/02* | (2006.01) |

(52) U.S. Cl.

CPC ........... *H01Q 1/526* (2013.01); *H01Q 1/2283* (2013.01); *H01Q 1/50* (2013.01); *H01Q 21/0075* (2013.01); *H01Q 13/02* (2013.01)

(58) Field of Classification Search

CPC ........ H01Q 1/2283; H01Q 1/50; H01Q 1/526; H01Q 13/02; H01Q 21/0075

See application file for complete search history.

(56) References Cited

U.S. PATENT DOCUMENTS

| | | | |
|---|---|---|---|
| 9,219,296 | B2 | 12/2015 | Herbsommer et al. |
| 2016/0351996 | A1 | 12/2016 | Ou |

(Continued)

FOREIGN PATENT DOCUMENTS

| | | | | |
|---|---|---|---|---|
| CN | 102176522 A | | 9/2011 | |
| CN | 118174008 A | * | 6/2024 | ............. H01Q 1/526 |
| TW | 201351779 A | | 12/2013 | |

(Continued)

*Primary Examiner* — Daniel Munoz

(74) *Attorney, Agent, or Firm* — Li & Cai Intellectual Property (USA) Office

(57) ABSTRACT

A millimeter-wave antenna module includes a circuit board and a plurality of millimeter-wave antenna structures. Each of the millimeter-wave antenna structures includes a substrate assembly, a feeding opening structure, a feeding stripline, and a shielding cover. The feeding opening structure and the feeding stripline are each disposed in the substrate assembly, and a portion of the feeding stripline is exposed in the feeding opening structure. The feeding opening structure is covered by the shielding cover, a side of the shielding cover has an opening, and a height of the shielding cover is increased along a direction toward the opening. The feeding stripline is configured to emit an electromagnetic wave signal in a single and horizontal direction through the feeding opening structure and the shielding cover.

9 Claims, 14 Drawing Sheets

(56) References Cited

U.S. PATENT DOCUMENTS

| | | | | |
|---|---|---|---|---|
| 2023/0078966 | A1 | 3/2023 | Pandey et al. | |
| 2025/0226562 | A1* | 7/2025 | Li | G01R 29/0878 |

FOREIGN PATENT DOCUMENTS

| | | | | |
|---|---|---|---|---|
| TW | 202316734 | A | 4/2023 | |
| TW | 202327169 | A | 7/2023 | |
| WO | WO-2022172313 | A1 * | 8/2022 | H01Q 13/02 |

* cited by examiner

MILLIMETER-WAVE ANTENNA STRUCTURE AND MILLIMETER-WAVE ANTENNA MODULE

CROSS-REFERENCE TO RELATED PATENT APPLICATION

This application claims the benefit of priorities to China Patent Application No. 202410383293. X, filed on Mar. 29, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an antenna module, and more particularly to a millimeter-wave antenna structure and a millimeter-wave antenna module.

BACKGROUND OF THE DISCLOSURE

In order to achieve the advantages of saving cost and reducing volume for conventional millimeter wave antenna structures being adopted in mobile devices, most of the conventional millimeter wave antenna structures each adopt an antenna in package (AiP).

However, when each of the conventional millimeter-wave antenna structures adopts the antenna in package, an electromagnetic wave signal generated from each of the conventional millimeter-wave antenna structures can only be radiated along a radiation direction toward an upper side of the antenna body (i.e., a direction of the antenna boresight). Therefore, each of the conventional millimeter wave antenna structures is limited to be located on the side edge of the mobile device, thus affecting the design flexibility and heat dissipation effect of the conventional millimeter-wave antenna structure.

SUMMARY OF THE DISCLOSURE

In response to the above-referenced technical inadequacy, the present disclosure provides a millimeter-wave antenna structure and a millimeter-wave antenna module that can effectively improve the inadequacy of the conventional millimeter wave antenna structures.

In order to solve the above-mentioned problems, one of the technical aspects adopted by the present disclosure is to provide a millimeter-wave antenna structure. The millimeter-wave antenna structure includes a substrate assembly, a feeding opening structure, a feeding stripline, and a shielding cover. The feeding opening structure and the feeding stripline each is disposed in the substrate assembly. A portion of the feeding stripline is exposed in the feeding opening structure. The feeding opening structure is covered by the shielding cover. A side of the shielding cover has an opening, and a height of the shielding cover is increased along a direction toward the opening. The feeding stripline is configured to emit an electromagnetic wave signal in a single and horizontal direction through the feeding opening structure and the shielding cover.

In one of the possible or preferred embodiments, the shielding cover includes a shielding body and two transverse extension plates. The shielding body has the opening. The two transverse extension plates extend from two opposite sides of the shielding body. Two projection regions defined by orthogonally projecting the two transverse extension plates onto the substrate assembly are parallel to each other.

In one of the possible or preferred embodiments, the shielding cover further includes a longitudinal extension plate that extends from a side of the shielding body away from the substrate assembly. A projection region defined by orthogonally projecting the longitudinal extension plate onto the substrate assembly is located between the two transverse extension plates.

In one of the possible or preferred embodiments, a height of the longitudinal extension plate is equal to a thickness of the substrate assembly, or a width of each of the transverse extension plates is greater than or equal to the height of the longitudinal extension plate.

In one of the possible or preferred embodiments, the millimeter-wave antenna structure further includes a horn antenna having an input terminal and an output terminal, the input terminal of the horn antenna is connected to the opening of the shielding cover, and an inner diameter of the horn antenna is gradually increased from the input terminal to the output terminal.

In one of the possible or preferred embodiments, the substrate assembly includes a multi-layer board, two first metal via hole groups, and a second metal via hole group. Each of the two first metal via hole groups penetrates the multi-layer board, and the two first metal via hole groups are arranged on two sides of the multi-layer board, respectively. The second metal via hole group penetrates the multi-layer board. The second metal via hole group surrounds an outside of the feeding opening structure, and the second metal via hole group and the feeding opening structure are arranged between the two first metal via hole groups. The feeding opening structure includes a plurality of symmetrical openings and a symmetrical hole group, and the symmetrical hole group is connected to the feeding stripline.

In one of the possible or preferred embodiments, a first projection region is defined by orthogonally projecting the symmetrical openings onto a bottom layer of the multi-layer board, and a second projection region is defined by orthogonally projecting the symmetrical hole group onto the bottom layer of the multi-layer board. The first projection region overlaps with the second projection region.

In one of the possible or preferred embodiments, each of the symmetrical openings includes a first wing portion and a second wing portion, the first wing portion and the second wing portion are connected to and symmetrical with each other, and a first angle is defined between the first wing portion and the second wing portion.

In one of the possible or preferred embodiments, the symmetrical hole group includes a first side hole and a second side hole, and the first side hole and the second side hole are spaced apart from each other. A side of each of the first side hole and the second side hole away from the feeding stripline has an edge, and a second angle defined between the edge of the first side hole and the edge of the second side hole is greater than the first angle.

In order to solve the above-mentioned problems, another one of the technical aspects adopted by the present disclosure is to provide a millimeter-wave antenna module. The millimeter-wave antenna module includes a circuit board and a plurality of antenna structures. The antenna structures are disposed on the circuit board. Each of the plurality of antenna structures includes a substrate assembly, a feeding opening structure, a feeding stripline, and a shielding cover. The feeding opening structure and the feeding stripline each is disposed in the substrate assembly. A portion of the feeding stripline is exposed in the feeding opening structure. The feeding opening structure is covered by the shielding cover. A side of the shielding cover has an opening, and a height of the shielding cover is increased along a direction toward the opening. The feeding stripline is configured to emit an electromagnetic wave signal in a single and horizontal direction through the feeding opening structure and the shielding cover.

Therefore, in the millimeter-wave antenna structure and the millimeter-wave antenna module provided by the present disclosure, by virtue of "the feeding opening structure being covered by the shielding cover, and a height of the shielding cover being increased along a direction that extends toward the opening," the millimeter-wave antenna structure and the millimeter-wave antenna module can convert the electromagnetic wave signal from the feeding stripline to a waveguide structure of the shielding cover that uses air as a medium and radiate the electromagnetic wave signal outward in a single and horizontal direction, thereby achieving low loss and high efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
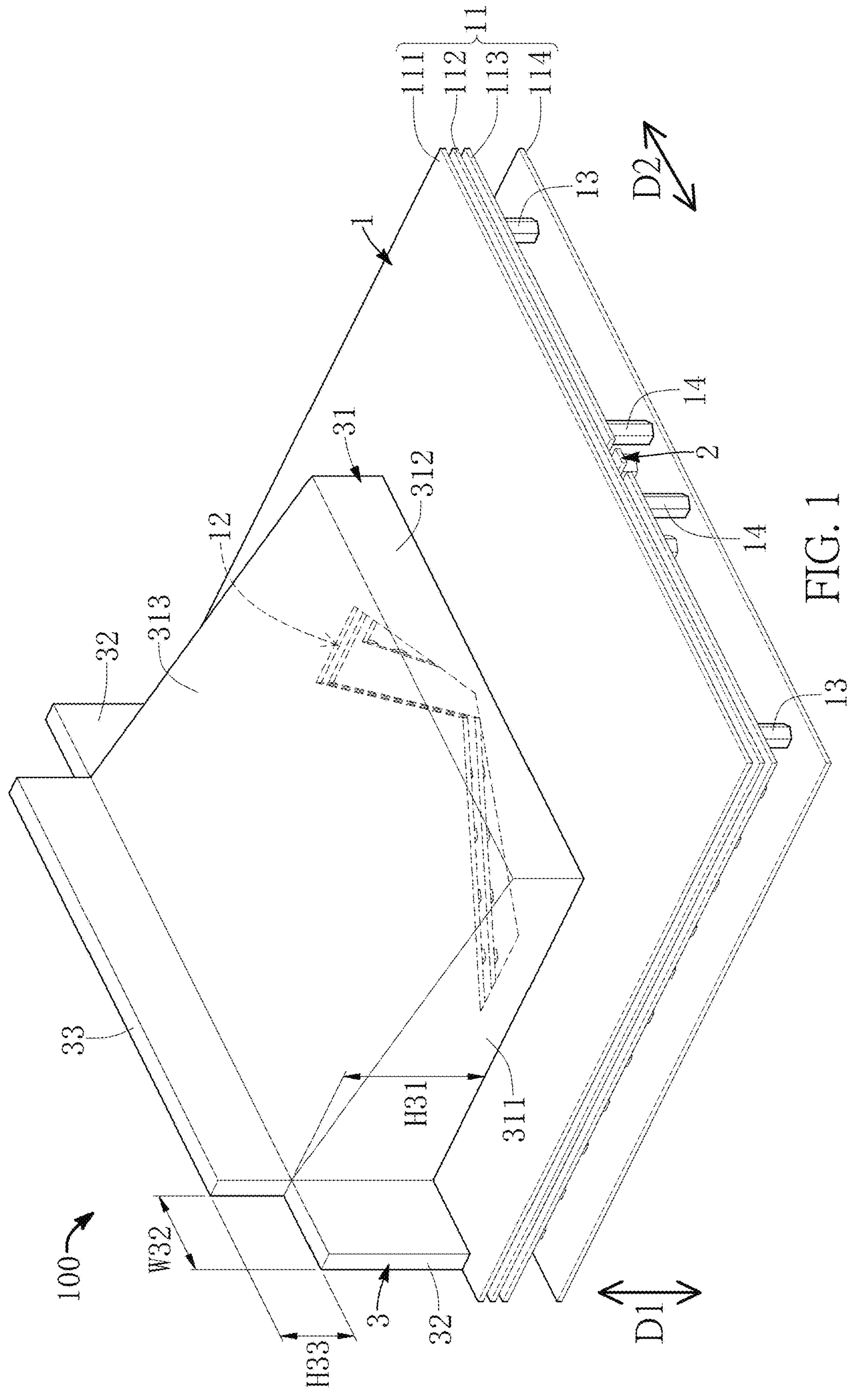
FIG. 1 is a schematic perspective view of a millimeter-wave antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
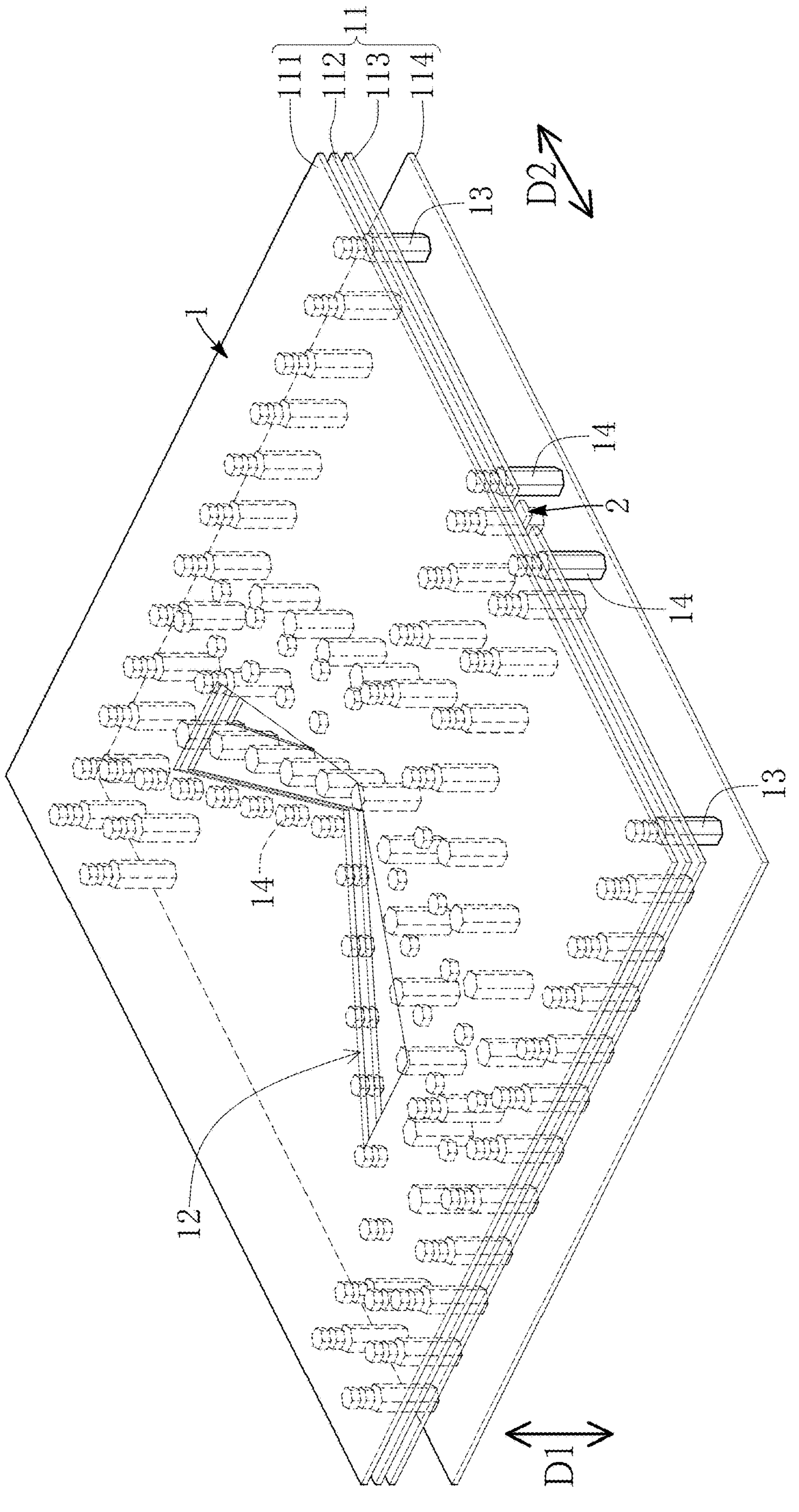
FIG. 2 is a schematic perspective view showing the millimeter-wave antenna structure of FIG. 1 with a shielding cover removed.
Figure 3:
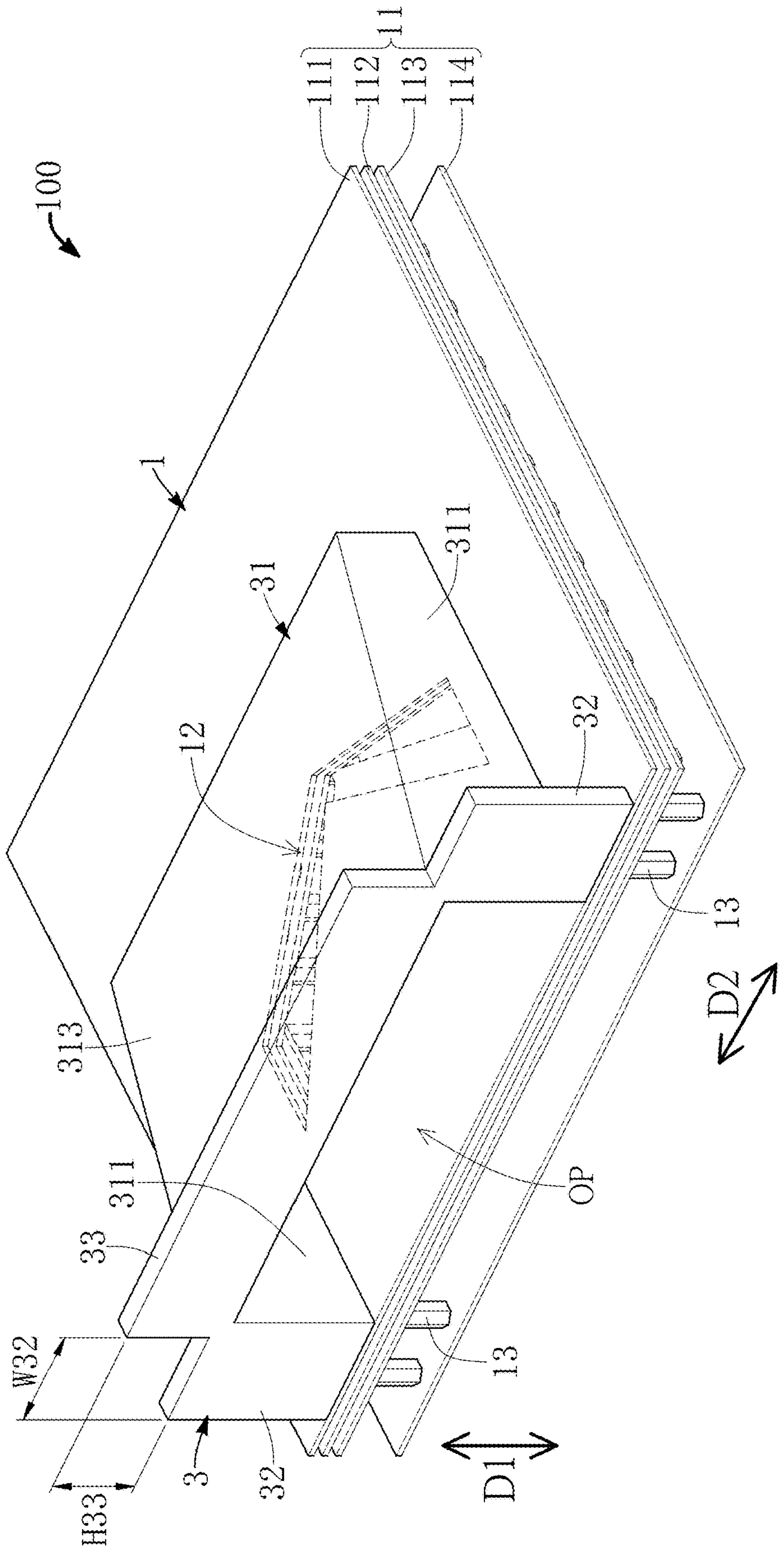
FIG. 3 is another schematic perspective view of the millimeter-wave antenna structure according to the first embodiment of the present disclosure.

Referring to FIG. 1 to FIG. 12, the present disclosure provides a millimeter-wave antenna structure 100. The millimeter-wave antenna structure 100 can be used in the 5G millimeter wave frequency band or higher frequency bands. As shown in FIG. 1 to FIG. 3, the millimeter-wave antenna structure 100 includes a substrate assembly 1, a feeding stripline 2 disposed in the substrate assembly 1, and a shielding cover 3 that is disposed on the substrate assembly 1. The millimeter-wave antenna structure 100 can emit an electromagnetic wave signal in a single and horizontal direction through the feeding stripline 2 and the shielding cover 3, so as to achieve effects of low loss and high efficiency.

The following description describes the structure and connection relation of each component of the millimeter-wave antenna structure 100. However, it should be noted that the following detailed description is only to help persons skilled in the art to understand the present disclosure, and the present disclosure is not limited to the following detailed description.

Further referring to FIG. 1 to FIG. 3, the substrate assembly 1 in the present embodiment includes a multi-layer board 11, and a feeding opening structure 12, two first metal via hole groups 13, and a second metal via hole group 14 that are disposed in the multi-layer board 11.

Specifically, the multi-layer board 11 includes a first conductive layer 111, a second conductive layer 112 spaced apart from the first conductive layer 111, a third conductive layer 113 spaced apart from a side of the second conductive layer 112 away from the first conductive layer 111, and a fourth conductive layer 114 spaced apart from a side of the third conductive layer 113 away from the second conductive layer 112.

Figure 4:
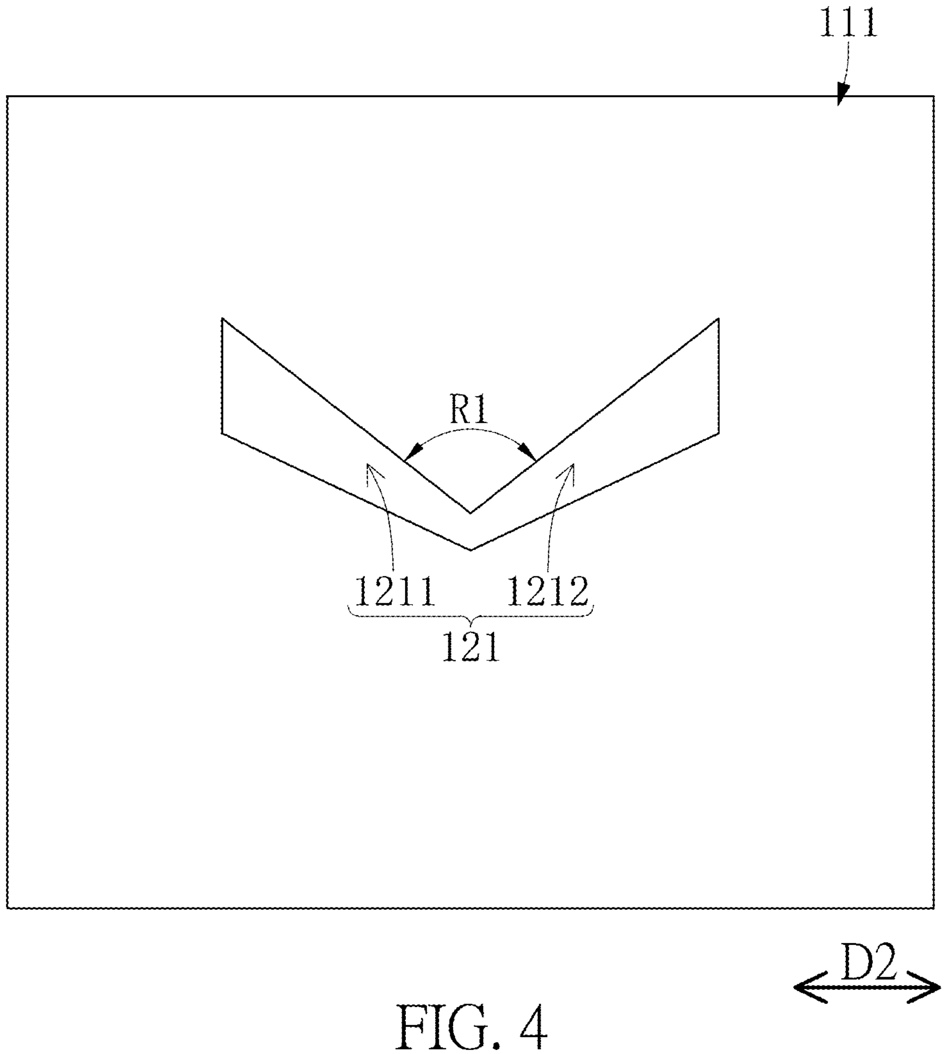
FIG. 4 is a schematic top view of a first conductive layer according to the first embodiment of the present disclosure.
Figure 5:
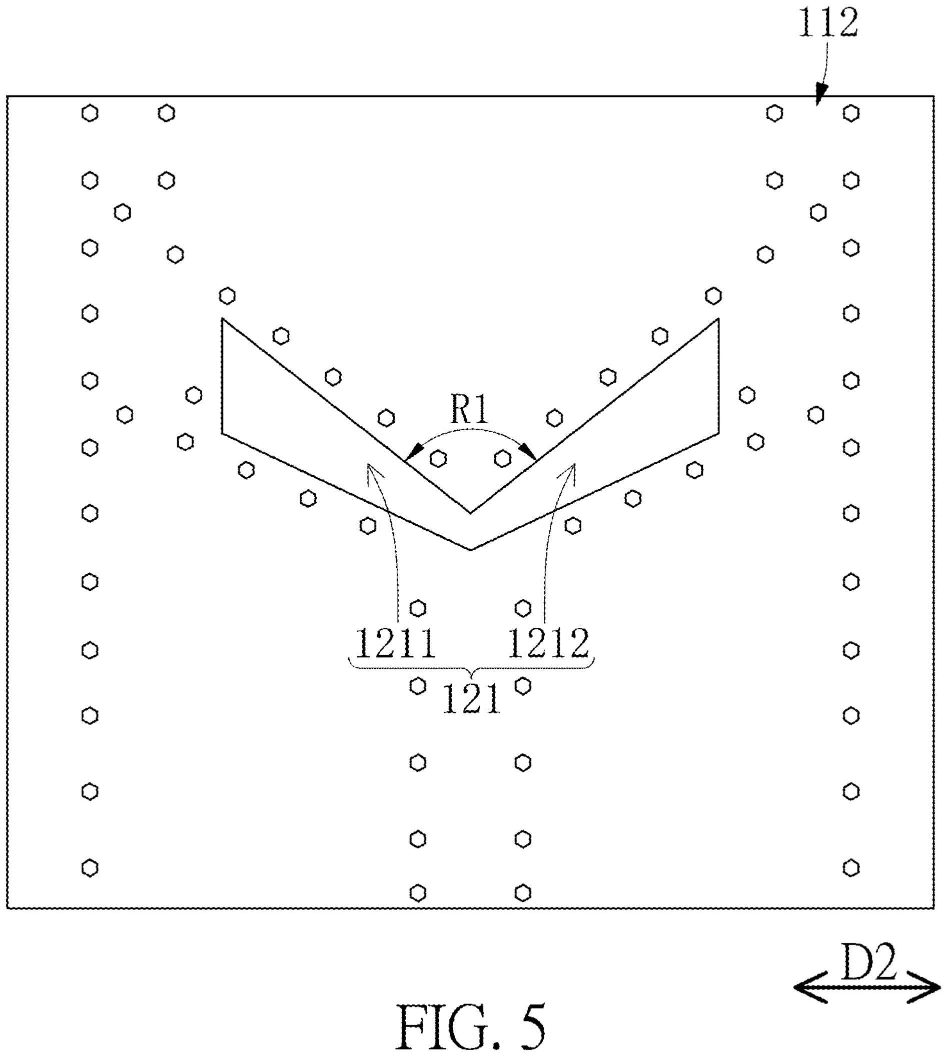
FIG. 5 is a schematic top view of a second conductive layer according to the first embodiment of the present disclosure.
Figure 6:
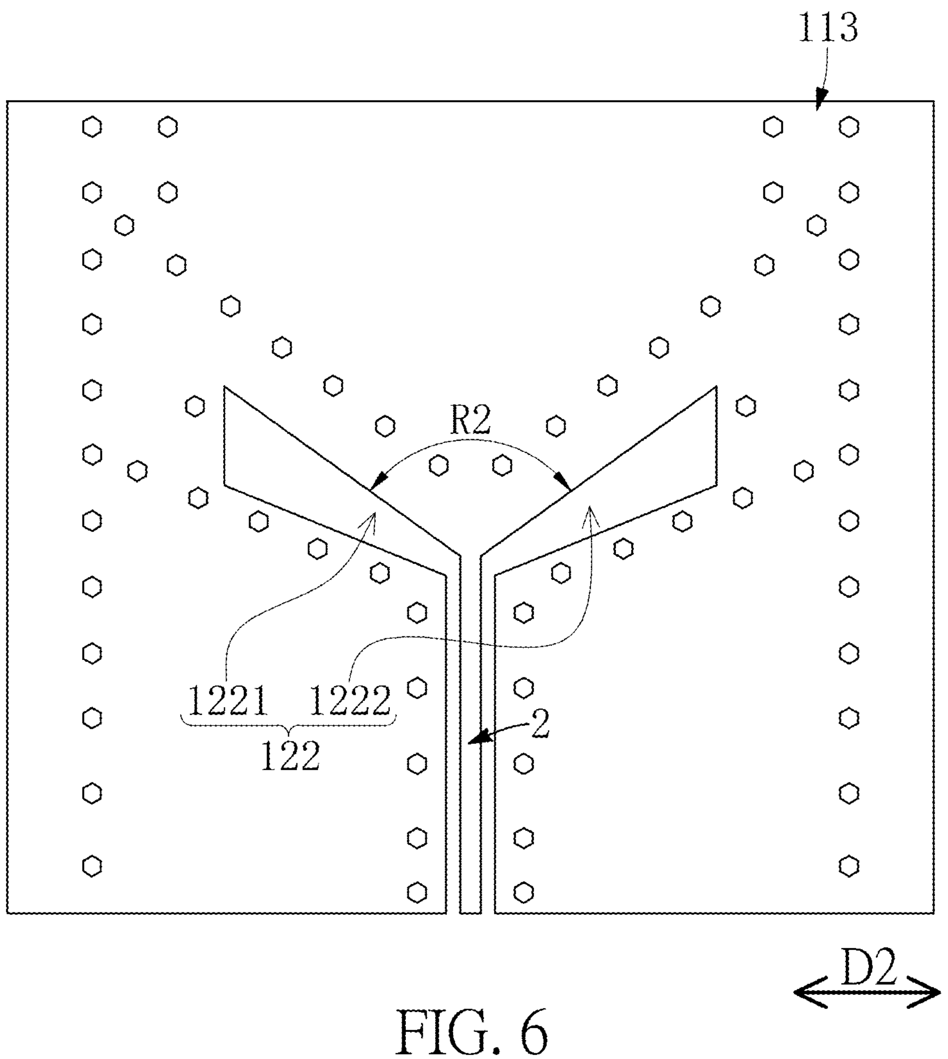
FIG. 6 is a schematic top view of a third conductive layer according to the first embodiment of the present disclosure.

As shown in FIG. 4 to FIG. 6, in the present embodiment, the feeding opening structure 12 includes a plurality of symmetrical openings 121 and a symmetrical hole group 122. The symmetrical openings 121 are respectively disposed on the first conductive layer 111 and the second conductive layer 112, and the symmetrical opening 121 located on the first conductive layer 111 corresponds in position and geometric shape to the symmetrical opening 121 located on the second conductive layer 112.

Furthermore, the symmetrical openings 121 in the present embodiment are symmetrically V-shaped, and each of the symmetrical openings 121 has a first wing portion 1211 and a second wing portion 1212 that is connected to the first wing portion 1211. A first angle R1 is between the first wing portion 1211 and the second wing portion 1212.

As shown in FIG. 6, the symmetrical hole group 122 is disposed on the third conductive layer 113, and the symmetrical hole group 122 is connected to the feeding stripline 2. The symmetrical hole group 122 includes a first side hole 1221 and a second side hole 1222 that is located on a side of the first side hole 1221. The shapes of the first side hole 1221 and the second side hole 1222 are substantially elongated trapezoidal shapes in the present embodiment, and the first side hole 1221 and the second side hole 1222 are spaced apart on the third conductive layer 113 to form a symmetrical V-shape.

In other words, the feeding stripline 2 extends linearly in a long line and is disposed between the first side hole 1221 and the second side hole 1222. The first side hole 1221 and the second side hole 1222 have left-right symmetry with respect to the feeding stripline 2 as a center line of symmetry, such that the first side hole 1221, the second side hole 1222, and the feeding stripline 2 are configured to jointly form a Y-shaped geometric configuration. In addition, a side of each of the first side hole 1221 and the second side hole 1222 away from the feeding stripline 2 has an edge, and a second angle R2 defined between the edge of the first side hole 1221 and the edge of the second side hole 1222 is greater than the first angle R1, but the present disclosure is not limited thereto.

Figure 7:
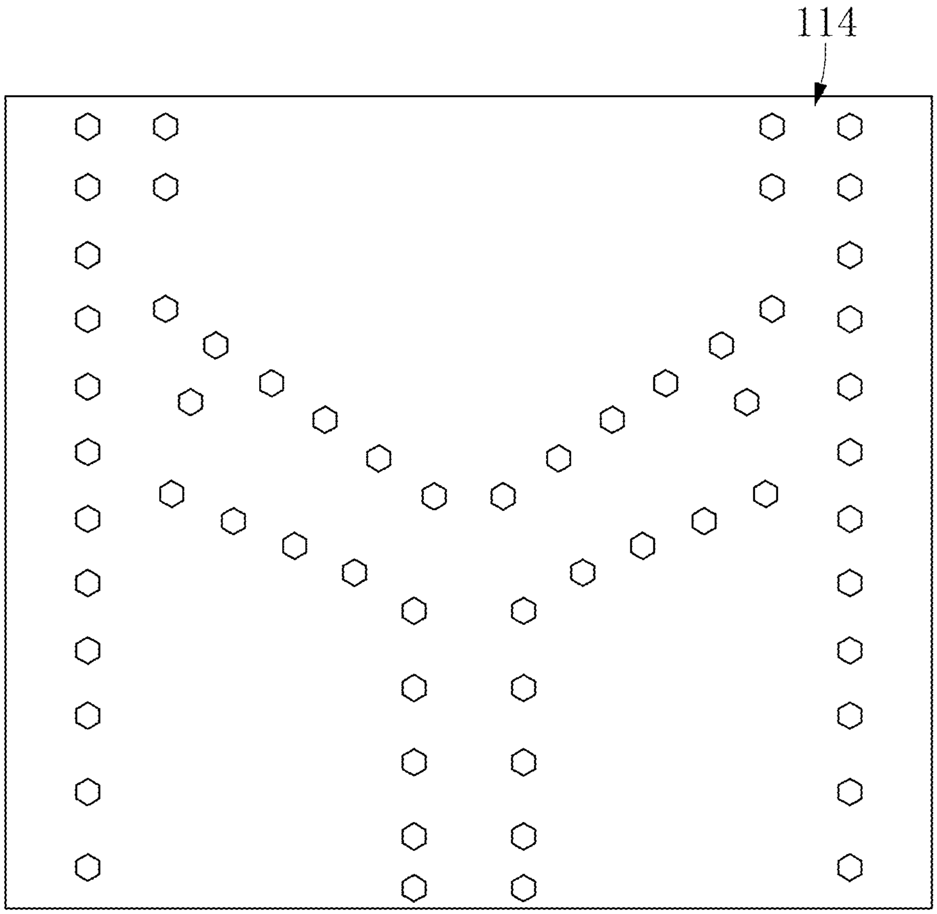
FIG. 7 is a schematic top view of a fourth conductive layer according to the first embodiment of the present disclosure.

As shown in FIG. 7, the fourth conductive layer 114 in the present embodiment serves as a grounding function component of the multi-layer board 11, and the fourth conductive layer 114 is electrically connected to the first conductive layer 111 through the two first metal via hole groups 13 and the second metal via hole group 14, such that the first conductive layer 111 is also a grounding function component.

Furthermore, in the present embodiment, the symmetrical openings 121 and the symmetrical hole group 122 have an offset distance in a height direction D1, such that the symmetrical openings 121 and the symmetrical hole group 122 do not completely overlap with each other. More specifically, a first projection region is defined by orthogonally projecting the symmetrical openings 121 onto a bottom layer (e.g., the fourth conductive layer 114) of the multi-layer board 11, and a second projection region is defined by orthogonally projecting the symmetrical hole group 122 onto the bottom layer of the multi-layer board 11. A portion of the first projection region overlaps with the second projection region (i.e., a portion of the symmetrical hole group 122 can be observed from a line of sight through the symmetrical openings 121), but the present disclosure is not limited thereto.

Further referring to FIG. 1 to FIG. 3, each of the two first metal via hole groups 13 and the second metal via hole group 14 penetrates into the multi-layer board 11. The two first metal via hole groups 13 are respectively arranged on two sides of the multi-layer board 11. The second metal via hole group 14 surrounds an outside of the feeding opening structure 12, and the second metal via hole group 14 and the feeding opening structure 12 are arranged between the two first metal via hole groups 13. Accordingly, an electric field of the electromagnetic wave signal can be transmitted between the second metal via hole group 14, such that the electric field of the electromagnetic wave signal can be transmitted from the feeding opening structure 12 to the air outside.

It should be noted that, a portion of the feeding stripline 2 in the present embodiment is exposed in the feeding opening structure 12. More specifically, because the symmetrical hole group 122 is connected to the feeding stripline 2, and the symmetrical hole group 122 and the symmetrical openings 121 have the offset distance in the height direction D1, the portion of the feeding stripline 2 can be exposed to the symmetrical openings 121 of the feeding opening structure 12. Accordingly, the electric field of the electromagnetic wave signal can be transmitted outward by the symmetrical openings 121 of the feeding opening structure 12 through the feeding stripline 2.

As shown in FIG. 1 and FIG. 3, the shielding cover 3 in the present embodiment is a square casing made of metal, such that the electromagnetic wave signal can be transmitted or reflected within the shielding cover 3. Furthermore, the shielding cover 3 includes a shielding body 31, and two transverse extension plates 32 and a longitudinal extension plate 33 that are connected to the shielding body 31.

The shielding body 31 has two first vertical walls 311 located on opposite sides, a second vertical wall 312 connected to the two first vertical walls 311, and a horizontal wall 313 that is connected to the two first vertical walls 311 and the second vertical wall 312. The shielding body 31 has an opening OP away from the side of the second vertical wall 312, that is, the opening OP is surrounded by the two first vertical walls 311 and the horizontal wall 313.

Further referring to FIG. 1 and FIG. 3, the two transverse extension plates 32 in the present embodiment are rectangular plates. The two transverse extension plates 32 respectively extend from the two first vertical walls 311 (i.e., opposite two sides) of the shielding body 31, and the two transverse extension plates 32 are respectively perpendicular to the two first vertical walls 311 of the shielding body 31. In addition, two projection regions defined by orthogonally projecting the two transverse extension plates 32 onto the the multi-layer board 11 are parallel to each other. That is, the two transverse extension plates 32 are in a linear arrangement. Preferably, a size and thickness of the two transverse extension plates 32 can be the same as each other, but the present disclosure is not limited thereto.

Further referring to FIG. 1 and FIG. 3, the longitudinal extension plate 33 in the present embodiment is a rectangular plate, and the longitudinal extension plate 33 extends along a direction away from the multi-layer board 11 from the horizontal wall 313. The longitudinal extension plate 33 can preferably be perpendicular to the horizontal wall 313, but the present disclosure is not limited thereto. Specifically, a second projection region defined by orthogonally projecting the longitudinal extension plate 33 onto the multi-layer board 11 is located between the two transverse extension plates 32, and the second projection region and the first projection region are preferably parallel to each other. In addition, a distance between the longitudinal extension plate 33 and the second vertical wall 312 is equal to a distance between each of the transverse extension plates 32 and the second vertical wall 312 in the present embodiment, but the present disclosure is not limited thereto.

Figure 8:
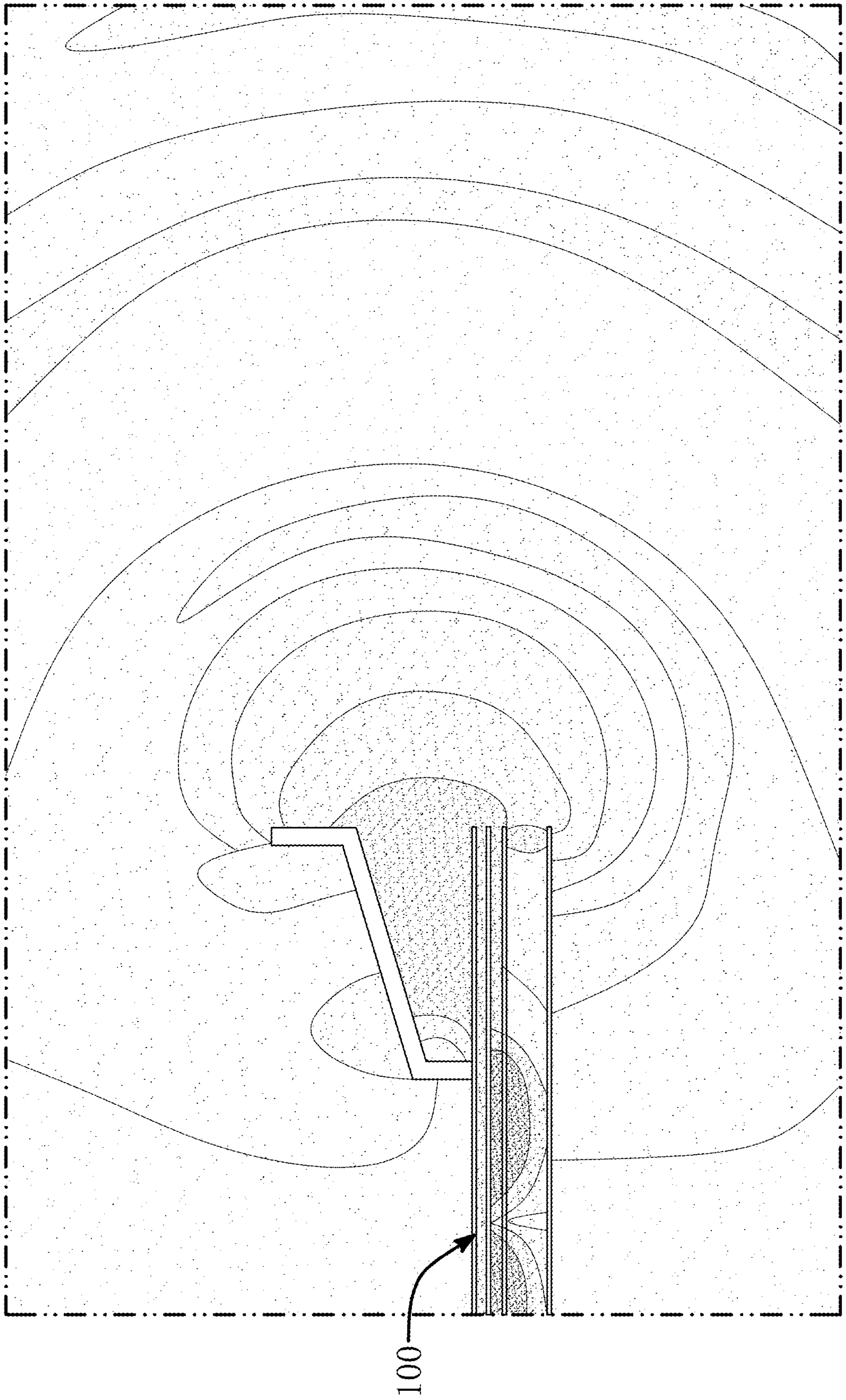
FIG. 8 is a schematic side view of an electric field strength distribution of the millimeter-wave antenna structure according to the first embodiment of the present disclosure.
Figure 9:
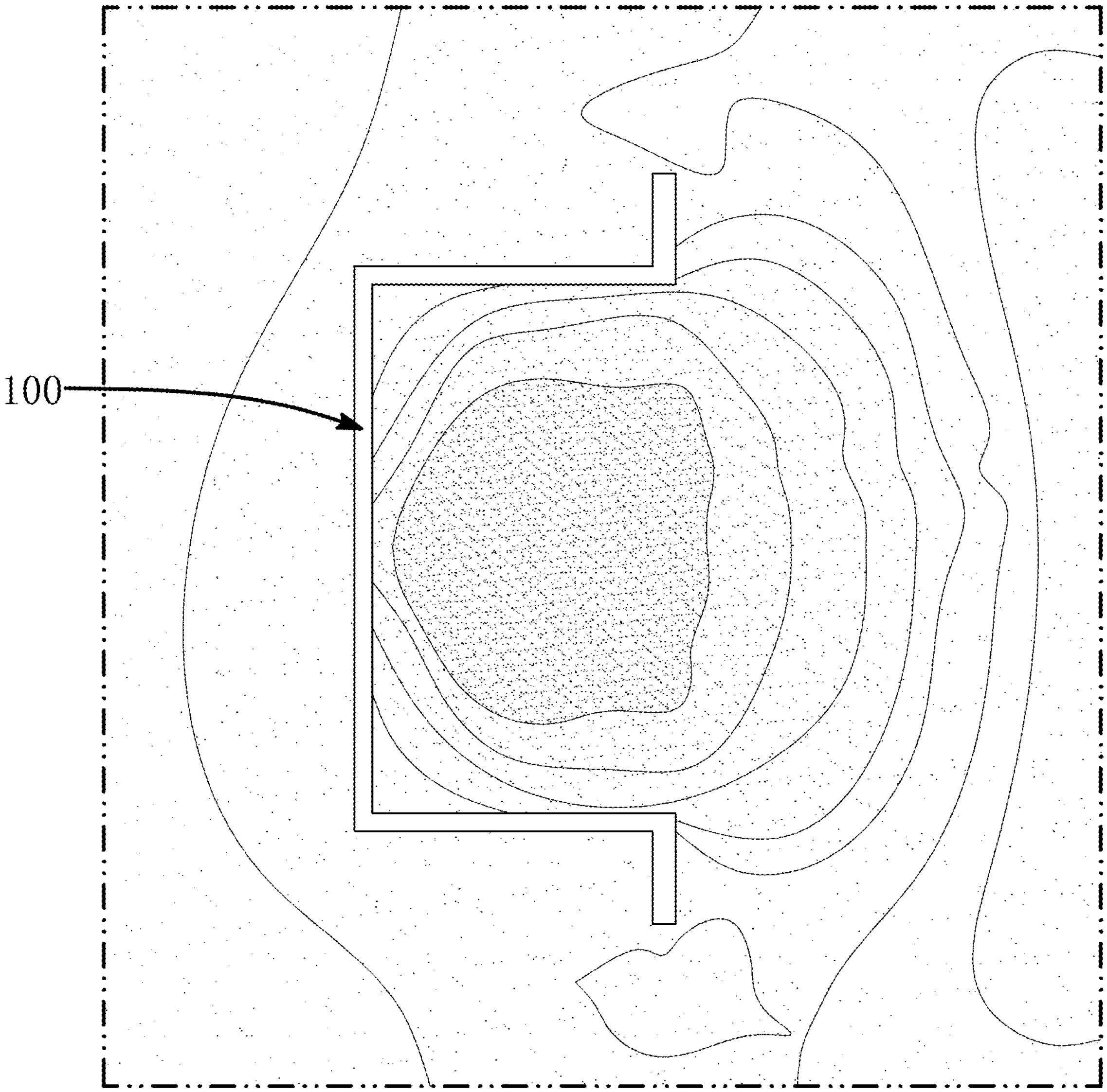
FIG. 9 is a schematic top view of the electric field strength distribution of the millimeter-wave antenna structure according to the first embodiment of the present disclosure.

Accordingly, in the present disclosure, by the design of arranging the two transverse extension plates 32 and the longitudinal extension plate 33 at the opening OP, the electric field of the electromagnetic wave signal can be prevented from diffraction and reflection reactions at the edge of the opening OP, thereby reducing energy reflection, increasing antenna gain, and improving directivity (as shown in FIG. 7 and FIG. 8, the greater a quantity of small black dots in each area (i.e., the higher a density) is, the stronger the electric field energy represented is).

It should be noted that, in the present embodiment, each of the transverse extension plates 32 has a width W32 along a width direction D2 of the multi-layer board 11, and the width W32 of each of the transverse extension plates 32 is substantially greater than or equal to a height H33 of the longitudinal extension plate 33 along the height direction D1, but the present disclosure is not limited thereto.

It should be noted that, the shielding body 31 has a height H31 along the height direction D1, and the height H31 of the shielding body 31 is increased along a direction toward the opening OP. A ratio of the height H33 of the longitudinal extension plate 33 to the thickness of the multi-layer board 11 is 1:1. That is, the height H33 of the longitudinal extension plate 33 is the same as the thickness of the multi-layer board 11.

Figure 10:
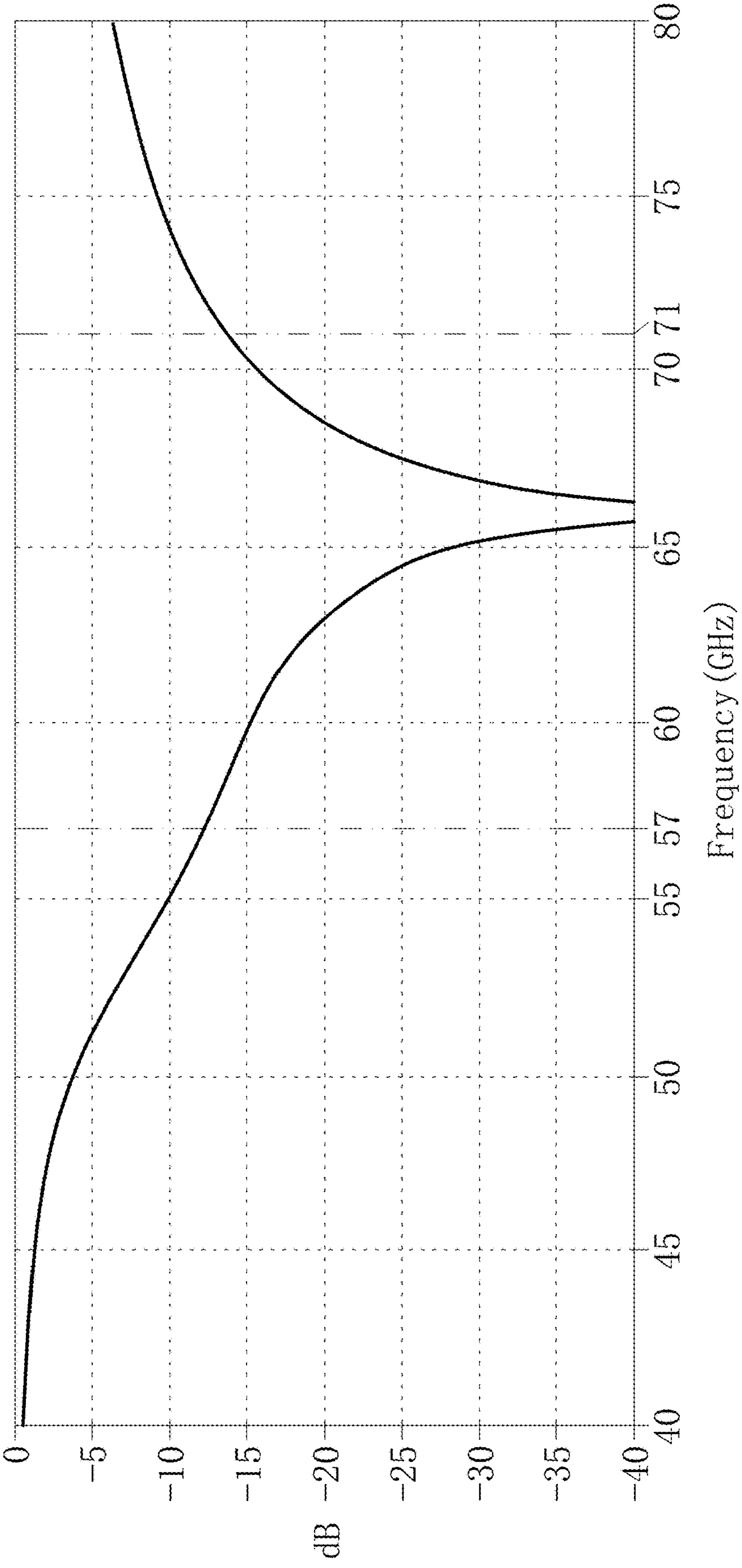
FIG. 10 is a schematic frequency response diagram of the millimeter-wave antenna structure according to the first embodiment of the present disclosure.

In addition, as shown in FIG. 10, it can be clearly seen in the frequency response diagram of S parameters that the return loss of the present embodiment in the n263 frequency band (i.e., from 57 GHz to 71 GHZ) of the second frequency range (FR2) in the 5G NR frequency band is greater than 10 dB. Accordingly, the millimeter-wave antenna structure 100 of the present embodiment is very suitable for application in the 5G millimeter wave frequency band or higher frequency bands.

Figure 11:
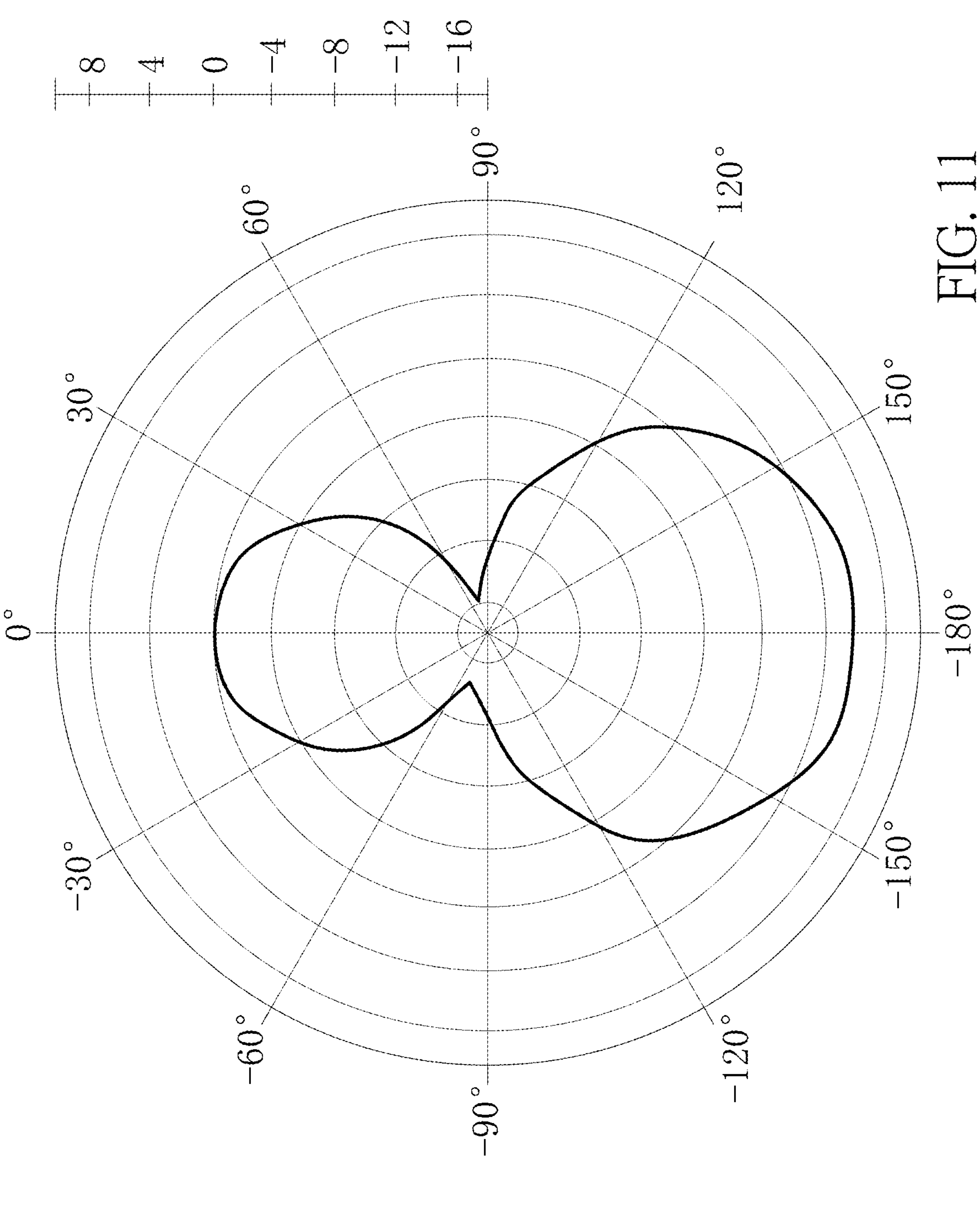
FIG. 11 is a schematic diagram of a radiation of the millimeter-wave antenna structure in an H-plane according to the first embodiment of the present disclosure.
Figure 12:
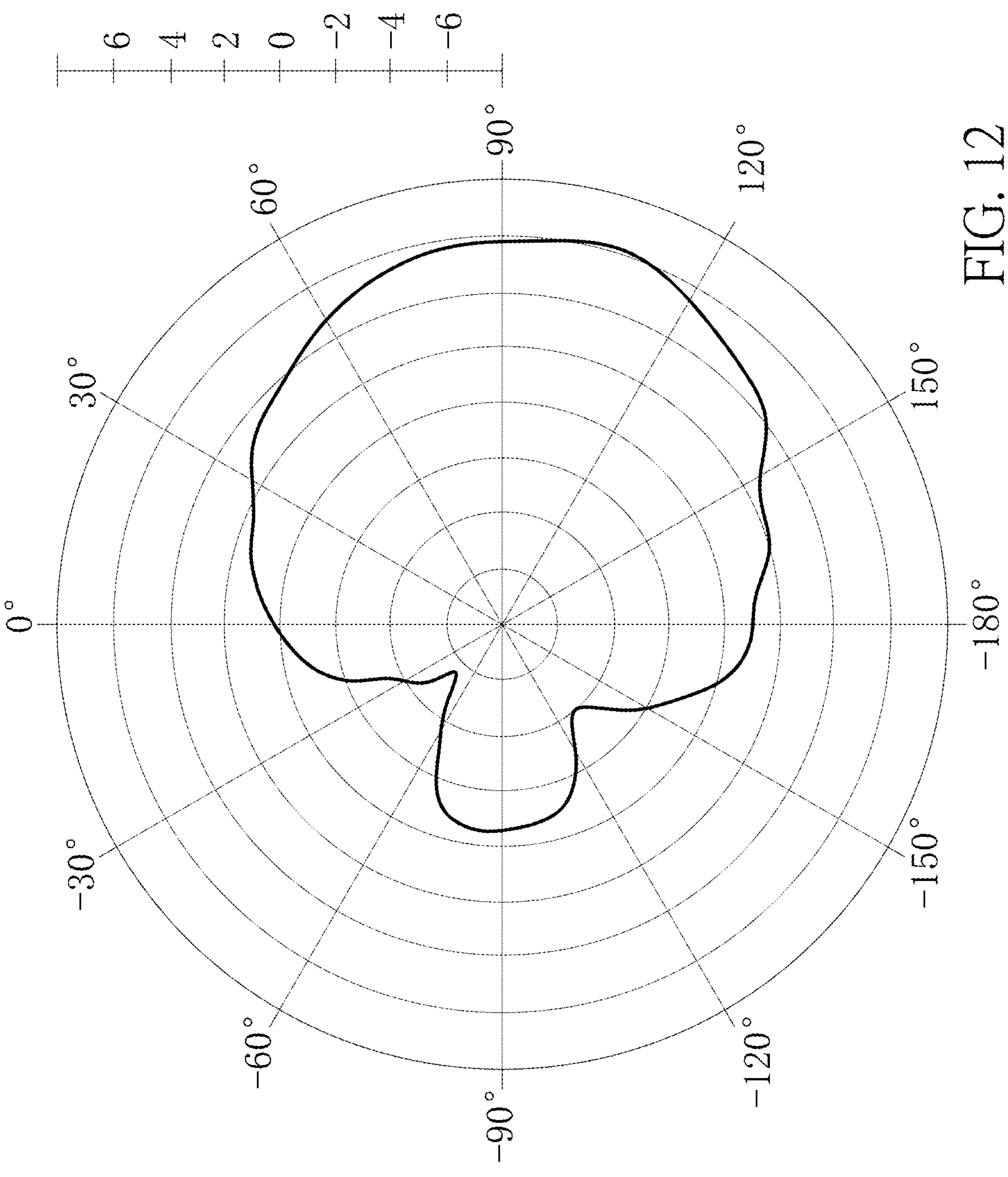
FIG. 12 is a schematic diagram of a radiation of the millimeter-wave antenna structure in an E-plane according to the first embodiment of the present disclosure.

As shown in FIG. 11 and FIG. 12, FIG. 11 and FIG. 12 are respectively an H-plane realized gain plot and an E-plane realized gain plot. When a frequency of the millimeter-wave antenna structure 100 of the present embodiment is 60 GHz, a peak realized gain of the millimeter-wave antenna structure 100 can reach 6.1 dB. Without considering the mismatch at a feeding terminal, the radiation efficiency of the millimeter-wave antenna structure 100 can reach 95.8 percent.

Second Embodiment

Figure 13:
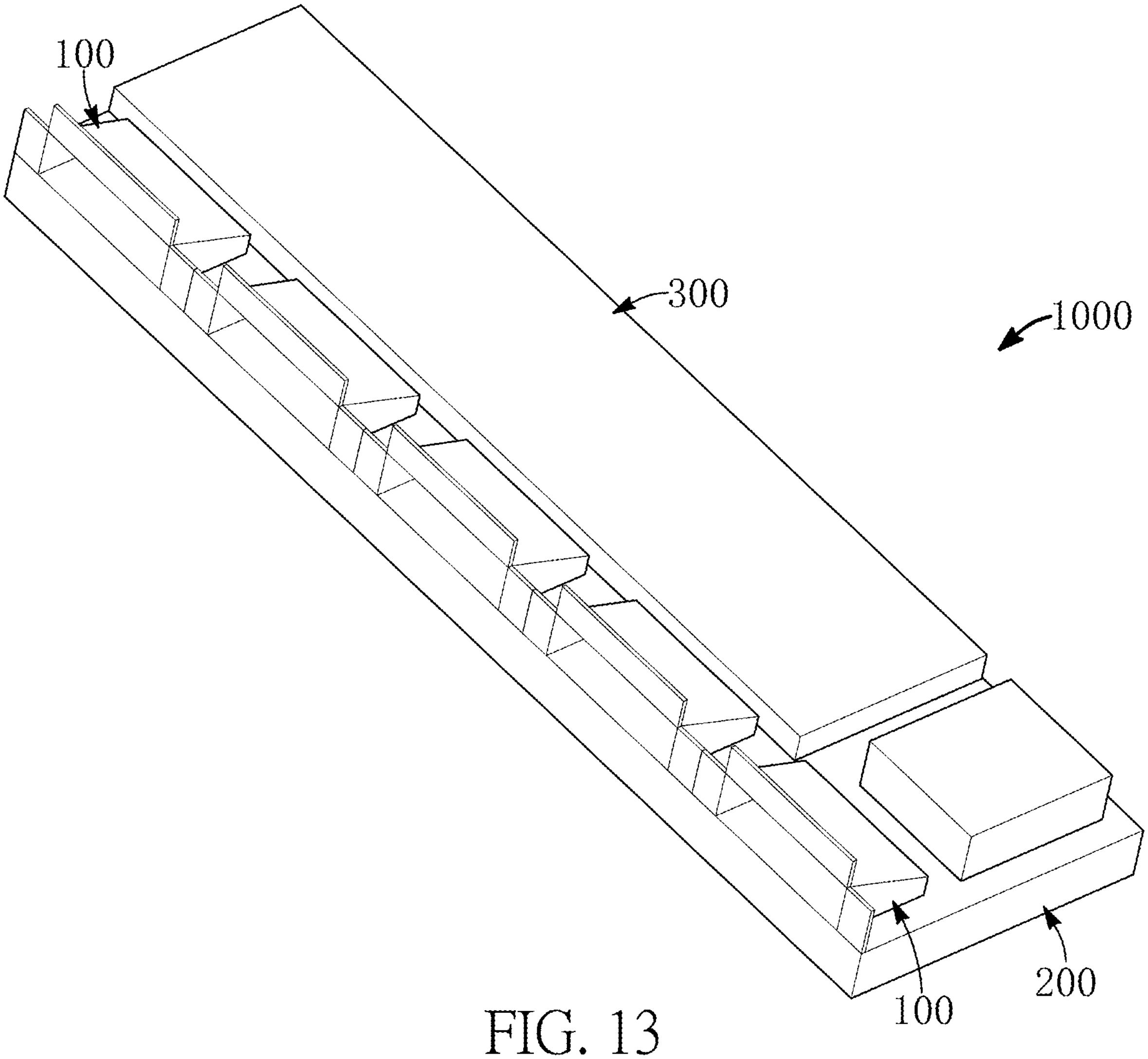
FIG. 13 is a schematic perspective view of a millimeter-wave antenna structure according to a second embodiment of the present disclosure.

Referring to FIG. 13, FIG. 13 shows a second embodiment of the present disclosure. Since the present embodiment is similar to the above-mentioned embodiment, the similarities between the present embodiment and the above-mentioned embodiment will not be reiterated. The differences between the present embodiment and the above-mentioned embodiment are described in the follow description.

Multiple ones of the millimeter-wave antenna structure 100 of the present disclosure are implemented in a millimeter-wave antenna module 1000; that is, the millimeter-wave antenna module 1000 of the present embodiment includes a circuit board 200, a plurality of millimeter-wave antenna structures 100 disposed on the circuit board 200, and a plastic packaging assembly 300 disposed on the circuit board 200.

The plurality of millimeter-wave antenna structures 100 are arranged in an array on the circuit board 200. A structure of each of the millimeter-wave antenna structures 100 is the same as in the first embodiment, and is not described in the present embodiment for sake of brevity.

The plastic packaging assembly 300 and the plurality of millimeter-wave antenna structures 100 are jointly located on a side of the circuit board 200, and the plastic packaging assembly 300 is located on a side of the plurality of millimeter-wave antenna structures 100, but the present disclosure is not limited thereto. For example, in other embodiments not shown in the present disclosure, the plastic packaging assembly 300 and the plurality of millimeter-wave antenna structures 100 can be respectively disposed on two opposite sides of the circuit board 200. In practice, the plastic packaging assembly 300 is used to package millimeter wave chips and passive components.

It is worth mentioning that, the millimeter-wave antenna module 1000 is based on an architecture of the millimeter-wave antenna module 1000, and the millimeter-wave antenna module 1000 can be installed horizontally on lateral sides of mobile devices (e.g., smartphones) to increase configuration flexibility.

Third Embodiment

Figure 14:
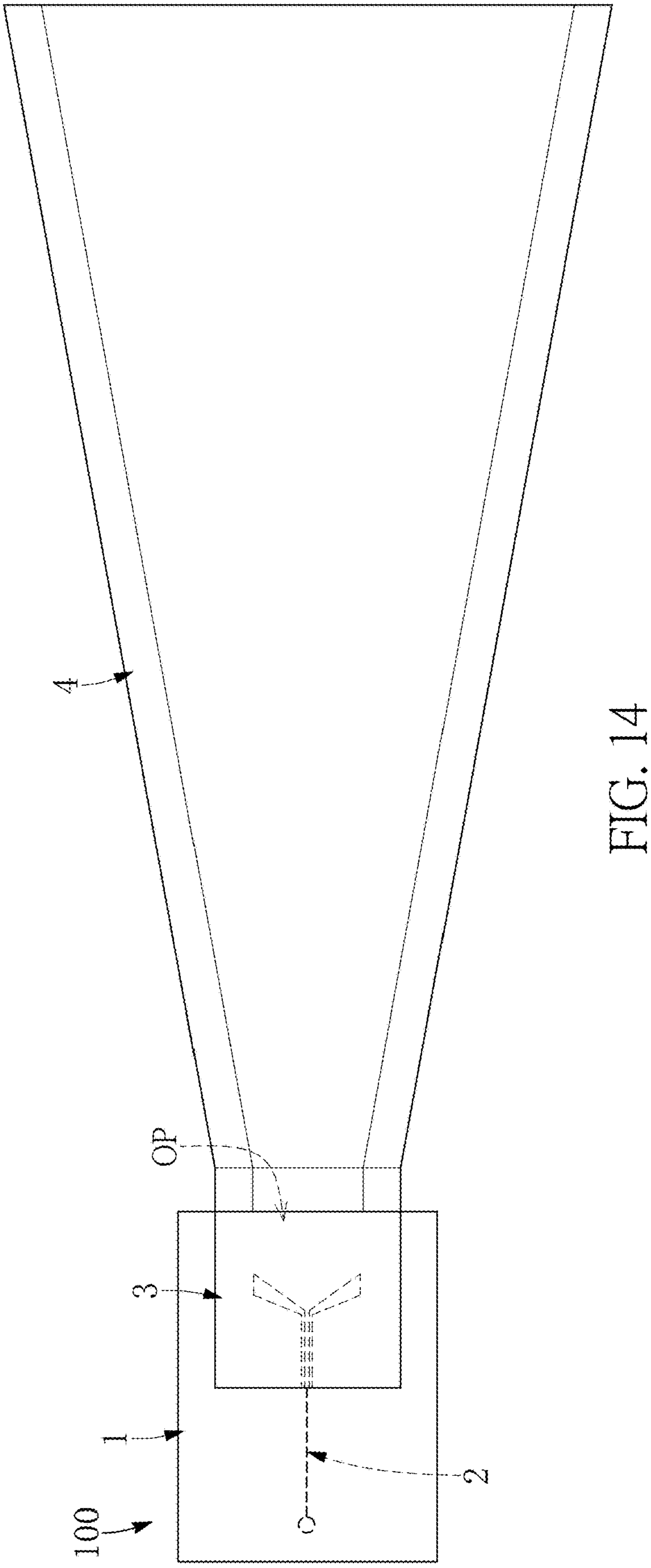
FIG. 14 is a schematic perspective view showing a millimeter-wave antenna structure applied to a horn antenna according to a third embodiment of the present disclosure.

Referring to FIG. 14, FIG. 13 shows a third embodiment of the present disclosure. Since the present embodiment is similar to the above-mentioned embodiment, the similarities between the present embodiment and the above-mentioned embodiment will not reiterated. The differences between the present embodiment and the above-mentioned embodiment are described in the follow description:

The opening OP of the millimeter-wave antenna structure 100 of the present embodiment is connected to a horn antenna 4, and the horn antenna 4 has an input terminal and an output terminal. The input terminal of the horn antenna 4 is connected to the opening OP of the shielding cover 3, and an inner diameter of the horn antenna 4 is gradually increased from the input terminal to the output terminal. The horn antenna 4 is arranged on the multi-layer board 11 in a ground-signal-ground (G-S-G) detection point manner, such that the present disclosure can be applied to the path loss correction of the antenna measurement room.

Beneficial Effects of the Embodiments

In conclusion, in the millimeter-wave antenna structure and the millimeter-wave antenna module provided by the present disclosure, by virtue of "the feeding opening structure being covered by the shielding cover, and a height of the shielding cover being increased along a direction that extends toward the opening," the millimeter-wave antenna structure and the millimeter-wave antenna module can convert the electromagnetic wave signal from the feeding stripline to a waveguide structure of the shielding cover that uses air as a medium of and radiate the electromagnetic wave signal outward in a single and horizontal direction, thereby achieving low loss and high efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A millimeter-wave antenna structure, comprising:
- a substrate assembly;
- a feeding opening structure and a feeding stripline each being disposed in the substrate assembly; wherein a portion of the feeding stripline is exposed in the feeding opening structure; and
- a shielding cover, wherein the feeding opening structure is covered by the shielding cover, a side of the shielding cover has an opening, and a height of the shielding cover is increased along a direction toward the opening;
- wherein the feeding stripline is configured to emit an electromagnetic wave signal in a single and horizontal direction through the feeding opening structure and the shielding cover;
- wherein the shielding cover includes:
  - a shielding body having the opening; and
  - two transverse extension plates extending from two opposite sides of the shielding body, wherein two projection regions defined by orthogonally projecting the two transverse extension plates onto the substrate assembly are parallel to each other.

2. The millimeter-wave antenna structure according to claim 1, wherein the shielding cover further includes a longitudinal extension plate that extends from a side of the shielding body away from the substrate assembly, and wherein a projection region defined by orthogonally projecting the longitudinal extension plate onto the substrate assembly is located between the two transverse extension plates.

3. The millimeter-wave antenna structure according to claim 2, wherein a height of the longitudinal extension plate is equal to a thickness of the substrate assembly, or a width of each of the transverse extension plates is greater than or equal to the height of the longitudinal extension plate.

4. The millimeter-wave antenna structure according to claim 1, wherein the millimeter-wave antenna structure further includes a horn antenna having an input terminal and an output terminal, the input terminal of the horn antenna is connected to the opening of the shielding cover, and an inner diameter of the horn antenna is gradually increased from the input terminal to the output terminal.

5. The millimeter-wave antenna structure according to claim 1, wherein the substrate assembly includes:
- a multi-layer board;

- two first metal via hole groups, wherein each of the two first metal via hole groups penetrates the multi-layer board, and the two first metal via hole groups are arranged on two sides of the multi-layer board, respectively; and
- a second metal via hole group penetrating the multi-layer board, wherein the second metal via hole group surrounds an outside of the feeding opening structure, and the second metal via hole group and the feeding opening structure are arranged between the two first metal via hole groups;
- wherein the feeding opening structure includes a plurality of symmetrical openings and a symmetrical hole group, and the symmetrical hole group is connected to the feeding stripline.

6. The millimeter-wave antenna structure according to claim 5, wherein a first projection region is defined by orthogonally projecting the symmetrical openings onto a bottom layer of the multi-layer board, and a second projection region is defined by orthogonally projecting the symmetrical hole group onto the bottom layer of the multi-layer board; wherein the first projection region overlaps with the second projection region.

7. The millimeter-wave antenna structure according to claim 5, wherein each of the symmetrical openings includes a first wing portion and a second wing portion, the first wing portion and the second wing portion are connected to and symmetrical with each other, and a first angle is defined between the first wing portion and the second wing portion.

8. The millimeter-wave antenna structure according to claim 7, wherein the symmetrical hole group includes a first side hole and a second side hole, and the first side hole and the second side hole are spaced apart from each other, and wherein a side of each of the first side hole and the second side hole away from the feeding stripline has an edge, and a second angle defined between the edge of the first side hole and the edge of the second side hole is greater than the first angle.

9. A millimeter-wave antenna module, comprising:
- a circuit board; and
- a plurality of antenna structures disposed on the circuit board, wherein each of the plurality of antenna structures includes:
  - a substrate assembly;
  - a feeding opening structure and a feeding stripline each being disposed in the substrate assembly; wherein a portion of the feeding stripline is exposed in the feeding opening structure; and
  - a shielding cover, wherein the feeding opening structure is covered by the shielding cover, a side of the shielding cover has an opening, and a height of the shielding cover is increased along a direction toward the opening;
- wherein the feeding stripline is configured to emit an electromagnetic wave signal in a single and horizontal direction through the feeding opening structure and the shielding cover;
- wherein the shielding cover includes:
  - a shielding body having the opening; and
  - two transverse extension plates extending from two opposite sides of the shielding body, wherein two projection regions defined by orthogonally projecting the two transverse extension plates onto the substrate assembly are parallel to each other.

* * * * *